United States Patent [19]

Guillaud et al.

[11] 4,375,985

[45] Mar. 8, 1983

[54] SPENT OIL SHALE COMPOSITIONS AND USE

[75] Inventors: Maurice Guillaud, La Frette sur Seine, France; Paul H. Bissery, Golden, Colo.

[73] Assignees: Standard Oil Co. (Indiana); Gulf Oil Corp., both of Chicago, Ill.

[21] Appl. No.: 197,246

[22] Filed: Oct. 15, 1980

[51] Int. Cl.³ .............................................. C04B 19/04
[52] U.S. Cl. ........................................ 106/84; 106/85; 166/292; 405/267
[58] Field of Search .................... 106/85, 84; 166/292; 299/2, 11; 405/128, 129, 266, 267

[56] References Cited

U.S. PATENT DOCUMENTS

| 3,459,003 | 8/1969 | O'Neal | 299/11 |
| 4,120,355 | 10/1978 | Knepper et al. | 299/2 |
| 4,131,416 | 12/1978 | Watson et al. | 299/11 |

*Primary Examiner*—James Poer
*Attorney, Agent, or Firm*—Thomas W. Tolpin; William T. McClain; William H. Magidson

[57] ABSTRACT

A slurry composition and method of using the same is provided which is particularly useful in filling spent in situ oil shale retorts to form a strong load bearing mass which minimizes surface subsidence. The slurry is formed by mixing spent oil shale with 50 to 300 weight percent water and at least one material selected from the group consisting of lignosulfonate, sodium silicate, and sodium gluconate. The maximum concentration of each material selected is 4 weight percent based on the spent oil shale.

17 Claims, No Drawings

SPENT OIL SHALE COMPOSITIONS AND USE

BACKGROUND

This invention relates to compositions comprising spent oil shale, and their use. More specifically, this invention relates to aqueous slurries of spent oil shale including use of such slurries to form coherent masses having mechanical strength.

Numerous hydrocarbonaceous materials are found in underground deposits; for example crude oil, coal, shale oil, tar sands, and others. One method of recovering energy or hydrocarbon from such underground deposits is by underground combustion. An oxidizing gas such as air can be provided to an underground combustion or retorting zone so as to combust a portion of the combustible material contained therein and free hydrocarbon or thereby form materials which are suitable for energy recovery. For example, air or oxygen, and diluent gases such as steam, can be passed into a coal deposit so as to form off-gases having combustible materials such as light hydrocarbons and carbon monoxide. These gases can then be combusted directly for heat, or energy recovered such as through power generation. Underground combustion can be used in the recovery of petroleum crude oil from certain types of deposits. Air or oxygen, and steam, is passed into an underground deposit and combustion initiated so hot combustion gases will aid in the recovery of such crude oil. Similar technique can be used in the recovery of oil from tar sands. One important use of underground combustion is in the recovery of oil from oil shale.

The term "oil shale" refers to sedimentary deposits containing organic materials which can be converted to shale oil. Oil shale can be found in various places throughout the world, especially in the United States in Colorado, Utah, and Wyoming. Some especially important deposits can be found in the Green River formation in the Piceance Basin, Garfield and Rio Blanco counties, in Northwestern Colorado.

Oil shale contains organic material called kerogen which is a solid carbonaceous material from which shale oil can be produced. Commonly oil shale deposits have variable richness of kerogen content, the oil shale generally being stratified in horizontal layers. Upon heating oil shale to a sufficient temperature, kerogen is decomposed and liquids and gases are formed. Oil shale can be retorted to form a hydrocarbon liquid either by in situ or surface retorting. In surface retorting, oil shale is mined from the ground, brought to the surface, and placed in vessels where it is contacted with hot retorting materials, such as hot shale or gases, for heat transfer. The hot retorting solids or gases cause shale oil to be freed from the rock. Spent retorted oil shale which has been depleted in kerogen is removed from the reactor and discarded. Some well-known methods of surface retorting are the Tosco, Lurgi, and Paraho processes and fluid bed retorting.

Another method of retorting oil shale is the in situ process. In situ retorting of oil shale generally comprises forming a retort or retorting area underground, preferably within the oil shale zone. The retorting zone can be formed by mining an access tunnel to or near the retorting zone and then removing a portion of the oil shale deposit by conventional mining techniques. About 2 to about 50 percent, preferably about 15 to about 45 percent, of the oil shale in the retorting area is removed to provide void space in the retorting area. The oil shale in the retorting area is then rubblized by well-known mining and blasting techniques to provide a retort containing rubblized shale for retorting. In some cases it is possible to rubblize underground oil shale without removal of a portion of the oil shale. However, it is generally preferable to remove material so as to provide void space which will result in more uniform rubblization and more efficient use of explosives.

A common method for forming the underground retort is to undercut the deposit to be retorted and remove a portion of the deposit to provide void space. Explosives are then placed in the overlying or surrounding oil shale. These explosives are used to rubblize the shale, preferably forming a zone of rubble having uniform particle size and void spaces. Some of the techniques used for forming the undercut area and the rubblized area are room and pillar mining, sublevel caving, crater retreat and the like. Because of the stratification of oil shale it may be desirable to selectively mine material based on its mineral or kerogen content for removal from the retorting zone. Also because of the stratification, the retorting zone may contain lean oil shale, or rock containing essentially no kerogen. After the underground retort is formed, the pile of rubblized shale is subjected to retorting. Hot retorting gases are passed through the rubblized shale to effectively form and recover liquid hydrocarbon from the oil shale. This can be done by passing a gas comprising air or air mixed with steam through the deposit. Air can be forced into one end of the retort and a fire or flame front initiated. Combustion can be initiated by introducing fuels such as natural gas, propane, shale oil, and the like which are readily combustible with air. After combustion has been initiated, it can be sustained by combusting coke or spent or partially spent oil shale, oxygen contacting the coke forming or maintaining a flame front. This flame front is then passed slowly through the rubblized deposit to effect the retorting. Actually the hot combustion gases passing ahead of the flame front cause the retorting of oil shale and the formation of shale oil. Another suitable retorting fluid comprises hot combustion or retorting off-gas from the same or nearby underground retort. Not only is shale oil effectively produced, but also a mixture of off-gases is produced during retorting. Generally a mixture of off-gases, water and shale oil are recovered from the retort. This mixture undergoes preliminary separation commonly by gravity to separate the gases from the liquid oil from the liquid water. The off-gases commonly also contain entrained dust, and hydrocarbons, some of which are liquid or liquefiable under moderate pressure.

A number of patents describe methods of in situ retorting of oil shale, such as Karrick, L. C., U.S. Pat. No. 1,913,395; Karrick, S. N., U.S. Pat. No. 1,919,636; Uren, U.S. Pat. No. 2,481,051; Van Poollen, U.S. Pat. No. 3,001,776; Ellington, U.S. Pat. No. 3,586,377; Prats, U.S. Pat. 3,434,757; Garrett, U.S. Pat. No. 3,661,423; Ridley, U.S. Pat. No. 3,951,456; and Lewis, U.S. Pat. No. 4,017,119 which are hereby incorporated by reference and made a part hereof.

When oil shale is mined, brought to the surface, and retorted above ground, a large volume of spent oil shale is formed which creates a disposal problem. Often, this spent shale has relatively small particle size which makes dumping undesirable from an aesthetic and environmental viewpoint.

After an underground in situ oil shale retort is burned, the volume of spent shale within the retort has diminished somewhat and commonly does not adequately support the overlying structure. This lack of support can lead to surface subsidence.

When a series of underground in situ oil shale retorts are formed in an oil shale field, it is common to leave substantial areas of intact oil shale between these retorts in order to preserve the structural integrity of the retorts and to control the flow of gases, water, and the like.

Knepper et al., U.S. Pat. No. 4,120,355 and Watson et al., U.S. Pat. No. 4,131,416, teach the introduction of aqueous slurries of spent oil shale from surface retorting into spent subterranean in situ oil shale retorts to form mechanically strong structures. These structures can prevent surface subsidence above the retort, and prevent leaching of chemicals from the mass of rubblized spent shale underground.

Knepper et al. teach that materials can be added to the slurry of water and spent shale from surface retorting in order to modify various properties of the slurry or the solidified mass formed by the slurry. Additives can be used to modify the slurry viscosity or adjust the permeability to water or gas. Plasticizers such as clays, soaps, cement, methyl ethyl cellulose can be added. Clay, such as bentonite or montorillinite can be added. Retarders such as glue, gypsum, lignin and the like can be added to stop flash set or prevent premature solidification of the slurry.

O'Neal, U.S. Pat. No. 3,459,003 teaches the use of slurries of spent shale from surface retorting and water, and in some cases cement, for forming of a competent mass having structural strength underground.

Fondriest, U.S. Ser. No. 803,730, filed June 6, 1977, teaches the use of concrete, sometimes containing spent oil shale from surface retorting, to fill underground voids formed from the mining of oil shale or coal. The concrete forms load bearing pillars so that support pillars of hydrocarbonaceous material can be removed.

Aqueous slurries of spent oil shale from surface retorting often have high viscosities making pumping difficult. These slurries tend to set up or harden rapidly, leaving little time to move the slurry to the appropriate position. These slurries also tend to shrink by sweating during the hardening stage, and sometimes weaken the solid mass and shrink from its position of support.

Lignosulfonate is sometimes added to concrete as a retarder to delay setting. Sodium silicate is sometimes added to concrete as a bleeding limiter or stabilizing agent. See *Chemical Admixtures for Concrete*, M. R. Rixom, E.&F.N. SPON. LTD. (1978). However, lignosulfonate and sodium silicate have not been used in compositions with spent oil shale from retorting. The properties of compositions of spent shales are not predictable from data on concrete because these compositions are new compositions of matter. The properties of such compositions must be determined empiracally.

It is an object of this invention to provide aqueous slurries of spent oil shale from surface retorting which can form solid, load bearing structures.

It is an object of this invention to provide aqueous slurries of spent oil shale from surface retorting which have retarded set-up time.

It is an object of this invention to provide aqueous slurries of spent oil shale from surface retorting which have reduced water leakage or bleeding.

It is an object of this invention to provide a method for forming coherent underground structures which may be load bearing and/or decrease water permeability.

It is an object of this invention to provide an improved method of mining minerals such as ores, coal, oil shale and the like.

It is an object of this invention to provide an improved method of stabilizing spent subterranean in situ oil shale retorts.

SUMMARY OF THE INVENTION

The objects of this invention can be attained through the use of a composition comprising (a) one part by weight powdered spent oil shale from the retorting of oil shale; (b) about 50 to about 300 weight percent water; and (c) about 0 to about 4 weight percent lignosulfonate retarder; (d) about 0 to about 4 weight percent sodium silicate and (e) about 0 to about 4 weight percent sodium gluconate; provided that the amount of (c) plus (d) plus (e) must be greater than 0. Water content of these slurries is expressed as weight of water/weight of dry solid powdered oil shale and can be greater than 100 percent. Additive content of these slurries is expressed as weight of additive/weight of dry solid powdered oil shale.

A preferable composition comprises one part by weight powdered spent oil shale from the retorting of oil shale; about 50 to about 150 weight percent water; about 0.001 to about 0.5 weight percent lignosulfonate; and about 0.001 to about 0.5 weight percent sodium silicate. A still more preferable composition comprises one part powdered spent oil shale from the retorting of oil shale; about 75 to about 100 weight percent water; about 0.005 to about 0.05 weight percent lignosulfonate; and about 0.005 to about 0.05 weight percent sodium silicate. It is generally preferable to minimize the amount of water used in the slurries. Too much water can lead to excessive bleeding, decrease in set-up time and lower mechanical strength in the solidified mass. Enough water must be added for handling and solidification purposes.

The various compounds of the slurries are thoroughly mixed in commercially available equipment, generally at about ambient temperature. An attempt should be made to minimize energy consumption during mixing. The water used should preferably be relatively free of oil and detrimental chemicals.

These compositions can be used to provide a mechanically strong solid mass in a zone. The method for forming such masses comprises introducing the composition into the zone and allowing the composition to solidify. This method can be used to form a solid mass in subterranean cavities, such as mined out cavities in subterranean oil shale or coal formations, oil wells and the like. This method can be especially useful when introduced into a spent subterranean in situ oil shale retort where it can form a coherent load bearing mass with spent retorted oil shale, thereby preventing surface subsidence and leaching of chemicals from spent shale by ground water.

The composition is introduced into a zone and allowed to set. Generally the temperature conditions for introduction of the slurry and set-up are about 32° F. (0° C.) to about 212° F. (100° C.). At low temperatures, water will tend to freeze while at high temperatures water will evaporate from the slurry. Many zones have naturally occurring temperatures in the desired range.

However, zones can be heated or cooled to more optimum conditions. For example, a hot spent oil shale retort can be cooled as low as commercially feasible by the introducing of steam and water. This not only cools the rubble within, but also wets the surface.

The slurry can be introduced through pipes to the bottom of the retort, or through whatever adits are available such as access tunnels, drill holes, and the like. The slurry is preferably introduced in stages so as to minimize hydraulic pressure on the boundaries of the zone receiving the slurry.

While setting and for a period thereafter, the mass formed by the composition will change somewhat generally by leakage of a small amount of water.

Spent oil shale suitable for use in the compositions of this invention has been retorted so as to remove a substantial amount of the hydrocarbon from the oil shale. Commonly in the retorting of oil shale, coke forms on or in the oil shale. Coke is essentially hydrocarbon having a low hydrogen to carbon ratio. It is desirable to use spent oil shales having low carbon content in the compositions of this invention, such as less than about 0.5 weight percent, preferably less than about 0.2 weight percent and more preferably less than about 0.05 weight percent. Preferably, at least about 70 weight percent of the spent oil shale in the slurry composition has a maximum mesh size of 200 mesh, i.e. can pass through a standard U.S. sieve of 200 mesh.

The carbon content of spent oil shale can be reduced by contacting the spent shale with an oxygen containing gas such as air, at oxidizing or combustion conditions. This method is used by processes such as the Lurgi process to burn coke of spent oil shale, thereby recovering heat from the coke and reducing the oil shale carbon content to a low level.

The composition comprising spent oil shale can also comprise rubblized matter such as retorted or un-retorted oil shale, rock, steel or structural reinforcing, and the like.

The slurries of this invention can be used for the stabilization of spent in situ oil shale retorts, for increasing mechanical strength and decreasing surface subsidence and liquid permeability. These slurries can also be used to form construction blocks through the addition of a small amount of cement and possibly a coloring agent. The mining of minerals in seams, especially steep seams, can be enhanced by using these slurries to form solid, mechanically strong structures in mined out areas. For example, both open pit and tunnel coal mines can be filled or partially filled. These slurries can also be used as a base for roads or as additives for concrete.

The slurries desirably have low viscosity so that they can be easily moved to the desired location; slow set up time so that enough time is available for moving and positioning the slurry; and limited bleeding so that the slurry does not unduly lose water and break-up, become too permeable to liquids, and lose mechanical strength.

One preferred composition of spent retorted oil shale containing lignosulfonate comprises one part powdered spent oil shale from the retorting of oil shale; about 50 to about 150 weight percent water; and about 0.001 to about 2.0 weight percent lignosulfonate. A more preferred composition comprises one part powdered spent oil shale from the retorting of oil shale; about 75 to about 100 weight percent water; and about 0.001 to about 0.5 weight percent lignosulfonate.

Lignosulfonates are recovered from wood by processes such as those described in *Natural and Synthetic Polymers*, Henry I. Bolker, Marcel Dekker, Inc. (1974) pp. 590–592. The lignosulfonates are commonly salts of lignosulfonic acid, such as calcium or sodium salts. In some cases commercial lignosulfonate cement retarders contain other chemicals such as organic acids, salts, and others. One lignosulfonate which is suitable is Lignosulfite C6NF supplied by Avebene in France. This material has typical inspections of:

Water: 52 wt.%
Density: 1.25
pH: 4-4.5
Mineral ash at 800° C.: 2 wt.%
Reducing sugars: 9 wt.%
Calcium $Ca^{++}$: 0.9 wt.%
Total sulfur $S^{--}$: 3 wt.%
Total nitrogen N: 2.4 wt.%
Anti-Foam: Several wt.%

A suitable sodium gluconate contains approximately 50 weight percent solids and has the following typical inspections:

Refractometric dry material: 48–50 wt.%
pH: 4.5–5.5
Density: about 1.26 Kg/l
Residue after ignition: 20 wt.% max.
Reducing sugars (in MS): 16 wt.% max.
Minimum gluconate content: 80 wt.%

A suitable sodium silicate is a 35°–37° Baume density product, with a ratio $(SiO_2)/Na_2O = 3.3$ to 3.4 manufactured by "RHONE-POULENC Chimie-fine" of FRANCE (Type 7 N 34). This product has the following typical inspections:

Density: 1.33
Viscosity: 60–70 centipoise (at 20° C.)
pH: 10.5–11.5
Silicate content: 25–26 wt.%
Sodium content: 7–8 wt.%
Water content: 66–68 wt.%

Another preferred composition of spent retorted oil shale containing sodium silicate comprises one part powdered spent oil shale from the retorting of oil shale; about 50 to about 150 weight percent water; and about 0.001 to about 2.0 weight percent sodium silicate. A more preferred composition comprises one part powdered spent oil shale from the retorting of oil shale; about 75 to about 100 weight percent water; and about 0.001 to about 0.5 weight percent sodium silicate.

Another preferred composition of spent retorted oil shale containing sodium gluconate comprises one part powdered spent oil shale from the retorting of oil shale; about 50 to about 150 weight percent water; and about 0.001 to about 2.0 weight percent sodium gluconate. A more preferred composition comprises one part powdered spent oil shale from the retorting of oil shale; about 75 to about 100 weight percent water; and about 0.001 to about 0.5 weight percent sodium silicate.

The following are two samples of spent shale from surface oil shale retorts:

|  | Specific weight (g/cm$^3$) | Grains 40 m (ASTM 370) | Carbonate content | pH value |
|---|---|---|---|---|
| Sample A | 2.698 | 1.5% | 34.8% | 11.75 |
| Sample B | 2.695 | 7.6% | 34.9% | 11.80 |

The specific weight of the grains was measured by the picnometer method. For the grain size analysis full deflocculation could not be obtained for the hydrometer analysis of fine particles. As a consequence, the grain-size distribution curves are limited to 40 microns. The carbonate content was measured by reaction of hydrochloric acid on the spent shale and measurement of the amount of $CO_2$ liberated during the chemical reaction. The pH value was measured by use of a pH-meter on a dilution of 10 grams of spent shale in 500 grams of demineralized water.

For the purposes of the following tests, a mixture of 48.6 weight percent Sample A and 51.4 weight percent Sample B was used, hereinafter referred to as shale C.

Two slurries of shale C and water were first prepared with solids proportions of 600 g/liter and 700 g/liter. As shown in examples 1 and 2 the setting times were found to be very short (less than 15 minutes). Grouts were then prepared by adding various chemicals as retarders to 600 g/liter shale C slurries. Eight types of retarders were used:

| C 6 NF | supplier: AVEBENE (France) |
|---|---|
| SUNLAN R2 | supplier: SUNLITH (France) |
| PORZITE L 932 | supplier: STERNSON Ltd. (Canada) |
| PORZITE HC | |
| PLASTIMENT BV 40 | supplier: SIKA (France) |
| PLASTIRETARD | |
| Acid sodium pyrophosphate (chemical) | |
| Sugar | |

Examples 1-30 show the relative effectiveness of the various additives as retarders and bleeding limiting agents in slurries of spent shale.

| Example # | 1 | 2 | 3 | 4 | 5 |
|---|---|---|---|---|---|
| Shale C amount (g/l) | 700 | 600 | 600 | 600 | 600 |
| Additives dosage ($cm^3/l$ or g/l) | — | — | C 6 NF 6 $cm^3/l$ | Sunlan R 2 6 $cm^3/l$ | Porzite L 932 2 $cm^3/l$ |
| Marsh viscosity (s) | 37.4 | 30.6 | 29.6 | 29.4 | 30.0 |
| Dynamic visc. (cP) | 27 | 19 | 6.7 | 8.8 | 7.5 |
| Yield value ($mg/cm^2$) | 141 | 132 | 2.4 | 4.9 | 7.3 |
| Bleeding (%) | 0 | 0 | 2 | 1 | 0.5 |
| Setting time (minutes) | <15 mn | <15 mn | 15 mn | 15 mn | 15 mn |
| Unconfined 2d. | 3.1 | 1.4 | 1.65 | 1.9 | 1.9 |
| compressive 7d. | 4.5 | 2.15 | 2.2 | 2.05 | 2.55 |
| strength 28d. ($10^5$ pascals) | 4.9 | 2.5 | 2.3 | 2.4 | 2.4 |

| Example # | 6 | 7 | 8 | 9 | 10 |
|---|---|---|---|---|---|
| Shale C amount (g/l) | 600 | 600 | 600 | 600 | 600 |
| Additives dosage ($cm^3/l$ or g/l) | Porzite HC 2 $cm^3/l$ | Plastiment BV 40 6 $cm^3/l$ | Plastiretard 3 $cm^3/l$ | Na pyrophosphate 6 g/l | Sugar 2 g/l |
| Marsh viscosity (s) | 29.6 | 29.2 | 29.4 | 29.4 | 31.0 |
| Dynamic visc. (cP) | 16 | 6.5 | 6.7 | 7 | 21 |
| Yield value ($mg/cm^2$) | 4.9 | 0 | 2.4 | 7.3 | 93 |
| Bleeding (%) | 4 | 4 | 20 | 10 | 0 |
| Setting time | 20 | 15 | 1 h 45 mn | 1 h 15 | <15 mn |
| Unconfined 2d. | 1.85 | 1.8 | 3.75 | 3.1 | too low |
| compressive 7d. | 2.65 | 2.1 | 8.8 | 3.8 | 2.05 |
| strength 28d. ($10^5$ pascals) | 2.55 | 2.75 | 8.5 | 4.0 | 2.25 |

| Example # | 11 | 12 | 13 | 14 | 15 |
|---|---|---|---|---|---|
| Shale C amount (g/l) | 900 | 800 | 800 | 800 | 800 |
| Additives dosage ($cm^3/l$ or g/l) | PLASTIRETARD | | | | |
| | 6 $cm^3/l$ | 4 $cm^3/l$ | 4 $cm^3/l$ + 8 g/l ($Na_2CO_3$) | 2.4 $cm^3/l$ | 1.6 $cm^3/l$ |
| Marsh viscosity (s) | 70.0 | 41.0 | 40.6 | 43.0 | 44.4 |
| Dynamic visc. (cP) | 71.5 | 26 | 27 | 27 | 26 |
| Yield value ($mg/cm^2$) | 51 | 22 | 14.6 | 24.4 | 34.2 |
| Bleeding (%) | 6 | 11 | 3 | 8 | 3 |
| Setting time | 2 h 45 | 2 h 30 | 1 h 45 | 2 h | 45 mn |
| Unconfined 2d. | 12.1 | 11.5 | 4.4 | 11.1 | 8.9 |
| compressive 7d. | 17.4 | 14.1 | 6.3 | 16 | 10.7 |
| strength 28d. ($10^5$ pascals) | 18.2 | 18.4 | 7.4 | 17.1 | 9.9 |

| Example # | 16 | 17 | 18 | 19 | 20 |
|---|---|---|---|---|---|
| Shale C amount (g/l) | 800 | 800 | 800 | 800 | 800 |
| Additives dosage ($cm^3/l$ or g/l) | PLASTIRETARD | | | C 6 NF | Porzite HC |
| | 1.2 $cm^3/l$ | 0.8 $cm^3/l$ | 0.8 $cm^3/l$ + 3 g/l ($Na_2CO_3$) | 16 $cm^3/l$ | 5 $cm^3/l$ |
| Marsh viscosity (s) | 44.0 | 44.0 | 85.0 | 39.6 | 40.2 |
| Dynamic visc. (cP) | 26.5 | 29 | 77 | 25 | 24 |
| Yield value ($mg/cm^2$) | 48.8 | 58.5 | 200 | 0 | 19.5 |
| Bleeding (%) | 1 | 0 | 0 | 16 | 10 |
| Setting time | 40 mn | 15 mn | 10 mn | 3 h 30 | 2 h 15 |
| Unconfined 2d. | | | | 3.3 | 9.7 |
| compressive 7d. | | | | 10.7 | 14.1 |
| strength 28d. ($10^5$ pascals) | | | | 15.0 | 16.9 |

| Example # | 21 | 22 | 23 | 24 | 25 |
|---|---|---|---|---|---|
| Shale C amount (g/l) | 800 | 800 | 800 | 800 | 800 |
| Additives dosage | ACID SODIUM PYROPHOSPHATE | | | | |
| | 8 g/l | 9 g/l | 9 g/l + 8 g/l ($Na_2CO_3$) | 10 g/l | 8 g/l (curing temp. 20° C.) |
| Marsh viscosity (s) | 47.8 | 43.0 | 45.0 | 45.6 | 47.8 |
| Dynamic visc. (cP) | 38 | 28.5 | 38.5 | 29.5 | 38.0 |
| Yield value ($mg/cm^2$) | 34.2 | 26.8 | 29.3 | 39.3 | 34.2 |
| Bleeding (%) | 4 | 3 | 0 | 2 | 5 |
| Setting time | 1 h 30 | 2 h 15 | 2 h 15 | 3 h 00 | 6 h 00 |
| Unconfined 2d. | — | — | 5.1 | 6.1 | — |
| compressive 7d. | — | 5.8 | 7.65 | 7.0 | — |
| strength 28d. ($10^5$ pascals) | — | 7.6 | 8.9 | 7.5 | — |

| Example # | 26 | 27 | 28 | 29 | 30 |
|---|---|---|---|---|---|
| Shale C amount (g/l) | 800 | 500 | 600 | 700 | 800 |
| Additives dosage | ACID SODIUM PYROPHOSPHATE | | | | |

|  | 8 g/l (stirred at 65° C. during 4 hours) | | | | |
|---|---|---|---|---|---|
| Marsh viscosity (s) | 47.8 | 28.4 | 29.8 | 35.0 | 70.0 |
| Dynamic visc. (cP) | 38.0 | 6.0 | 8.5 | 15.0 | 40.0 |
| Yield value (mg/cm$^2$) | 34.2 | 7.3 | 22.0 | 83 | 317 |
| Bleeding (%) | 0 | 1 | 0 | 0 | 0 |
| Setting time | 4 h + 2 h | 12 mn | 10 mn | 7 mn | 5 mn |
| Unconfined 2d. | — | 1.36 | 2.45 | 4.5 | 4.55 |
| compressive 7d. | — | 1.80 | 3.48 | 5.8 | 6.5 |
| strength 28d. (10$^5$ pascals) | — | 1.11 | 2.32 | 6.3 | 10.2 |

The effect of lignosulfonate (PLASTIRETARD) on the setting time of highly concentrated grouts is very noticeable: as the amount of retarder is increased from 0.8 cm$^3$/l to 4 cm$^3$/l, the setting time increases from 15 minutes to 2 hours 30 minutes (on a comparable sample it is of 5 minutes without any retarder added to the slurry). Viscosities are in the 40-44 Marsh seconds, which is considered acceptable for many handling purposes. The sweating increases rather quickly with the amount of added retarder. The addition of a stabilizing agent (sodium carbonate) to such grouts is effective in reducing the bleeding (11% for example 12 without NaCO$_3$ to 3% for example 13 with the same components plus NaCO$_3$). However the sodium carbonate reduces the setting time (2 hours 30 minutes to 1 hour 45 minutes) and the strength of the set grout. Lignosulfonate allows longer setting times to be obtained but a suitable stabilizer would be useful which does not substantially adversely affect setting time.

Other materials which were tested as retarders were:
Sulfuric acid, H$_2$SO$_4$
Phosphoric acid, H$_3$PO$_4$
Nitric acid, HNO$_3$
Orthoboric acid, H$_3$BO$_3$
Citric acid, C$_6$H$_8$O$_7$
Gluconic acid, CH$_2$OH—(CHOH)$_4$—CO$_2$H
Formic acid, CH$_2$O$_2$
Sodium nitrite, NaNO$_2$
Sodium chlorate, NaClO$_3$
Sodium borate, NaBO$_2$
Sodium citrate, Na$_3$C$_6$H$_5$O$_7$
Sodium formate, Na(HCOO)
Sodium fluoride, NaF
Di-sodium phosphate, Na$_2$HPO$_4$
Mono-sodium phosphate, NaH$_2$PO$_4$
Magnesium sulfate, MgSO$_4$
Magnesium chloride, MgCl$_2$
Red lead oxide, Pb$_3$O$_4$
Zinc oxide, ZnO
Glycerol, CH$_2$OH—CHOH—CH$_2$OH Pozzolith 100 × R  } Master Builders
Pozzolith 200 Norm }
Lanco Retard } Lanco France
Lanco Route }
Retardan P The following grouts were made from a slurry at a dosage of 800 grams of shale C per liter of grout. They were cured in a water bath at 65° C.

All the chemicals were always tested with the same dosing of 20 grams or 20 cm$^3$ per liter of mix, except for the three strong acids which were dosed to get a pH close to 7 (neutrality).

| Example # | 31 | 32 | 33 | 34 | 35 |
|---|---|---|---|---|---|
| Additives dosage (cm$^3$/l or g/l) | Phosphoric acid 18 cm$^3$/l | Sulfuric acid 21 cm$^3$/l | Nitric acid 52 cm$^3$/l | Lead oxide 20 g/l | Zinc oxide 20 g/l |
| Dynamic visc. (cP) | 31 | 75 | 25 | 46 | 36 |
| Yield value (mg/cm$^2$) | 93 | 488 | 68 | 151 | 230 |
| Bleeding (%) | +2 | 0 | +1 | 0 | 0 |
| Setting time | 45 mn | 15 mn | 2 h | 5 mn | 5 mn |
| U.C. Strength 7 days (10$^5$ Pa) | 1.3 | 3.4 | 3.2 | 4.6 | 8.1 |

| Example # | 36 | 37 | 38 | 39 | 40 |
|---|---|---|---|---|---|
| Additives dosage (cm$^3$/l or g/l) | Sodium nitrite 20 g/l | Sodium chlorate 20 g/l | mono sodium phosphate 20 g/l | Disodium phosphate 20 g/l | Sodium borate 20 g/l |
| Dynamic visc. (cP) | 42 | 40 | 38 | 33 | 36 |
| Yield value (mg/cm$^2$) | 166 | 141 | 63 | 102 | 88 |
| Bleeding (%) | 0 | 0 | +2 | 0 | 1 |
| Setting time | 5 mn | 5 mn | 45 mn | 25 mn | 1 h 25 |
| U.C. Strength 7 days (10$^5$ Pa) | 7.6 | 9.2 | 5.0 | 4.5 | 0.27 |

| Example # | 41 | 42 | 43 | 44 | 45 |
|---|---|---|---|---|---|
| Additives dosage (cm$^3$/l or g/l) | Sodium citrate 20 g/l | Sodium formate 20 g/l | Sodium fluoride 20 g/l | Boric acid 20 g/l | Citric acid 20 g/l |
| Dynamic visc. (cP) | 35 | 47 | 37 | 35 | 30 |
| Yield value (mg/cm$^2$) | 0 | 151 | 112 | 122 | 83 |
| Bleeding (%) | 5 | 0 | +1 | 0 | 1 |
| Setting time | 1 h | 5 mn | 25 mn | 2 h | 1 h 35 |
| U.C. Strength 7 days (10$^5$ Pa) | 6.1 | 7.8 | 6.5 | 0.55 | 0.64 |

| Example # | 46 | 47 | 48 | 49 | 50 |
|---|---|---|---|---|---|
| Additives dosage (cm$^3$/l or g/l) | Magnes. chloride 20 g/l | Magnes. sulfate 20 g/l | Formic acid 20 cm$^3$/l | Glycerol 20 cm$^3$/l | Gluconic acid 20 cm$^3$/l |
| Dynamic visc. (cP) | 33 | 36 | 34 | 33 | 29 |
| Yield value (mg/cm$^2$) | 117 | 112 | 93 | 93 | 54 |
| Bleeding (%) | +1 | +2 | 0 | 0 | 5 |
| Setting time | 25 mn | 20 mn | 35 mn | 5 mn | 24 h |

-continued

| | | | | | |
|---|---|---|---|---|---|
| U.C. Strength 7 days ($10^5$ Pa) | 5.35 | 6.15 | 3.2 | 7.1 | 1.3 |

| Example # | 51 | 52 | 53 | 54 | 55 |
|---|---|---|---|---|---|
| Additives dosage ($cm^3/l$) | Pozzolith $100 \times R$ 2.4 $cm^3/l$ | Pozzolith $100 \times R$ 5.6 $cm^3/l$ | Pozzolith $100 \times R$ 9.6 $cm^3/l$ | Pozzolith 200 norm 2.4 $cm^3/l$ | Pozzolith 200 norm 5.6 $cm^3/l$ |
| Dynamic visc. (cP) | 28 | 32 | 29.5 | 30 | 45 |
| Yield value ($mg/cm^2$) | 58.5 | 58.5 | 19.5 | 73 | 83 |
| Bleeding (%) | 0 | 0 | 4 | 0 | +1 |
| Setting time | 2 mn | 10 mn | 1 h 05 | 5 mn | 10 mn |
| U.C. Strength 7 days ($10^5$ Pa) | 10 | 6.6 | 5.8 | 10.3 | 6.6 |

| Example # | 56 | 57 | 58 | 59 | 60 |
|---|---|---|---|---|---|
| Additives dosage ($cm^3/l$) | Pozzolith 200 norm 9.6 $cm^3/l$ | Lanco retarder 10 $cm^3/l$ | Lanco retarder 20 $cm^3/l$ | Lanco retarder 30 $cm^3/l$ | Lanco route 15 $cm^3/l$ |
| Dynamic visc. (cP) | 29 | 29.5 | 26.5 | 25 | 32 |
| Yield value ($mg/cm^2$) | 19.5 | 19.5 | 12.2 | 4.9 | 78 |
| Bleeding (%) | 0 | 9 | 10 | 16 | 0 |
| Setting time | 20 mn | 2 hr 30 | 20 h | >24 h | 5 mn |
| U.C. Strength 7 days ($10^5$ Pa) | 6.0 | 11.8 | 6.5 | 7.0 | 8.4 |

| Example # | 61 | 62 | 63 | 64 | 65 |
|---|---|---|---|---|---|
| Additives dosage ($cm^3/l$ or g/l) | Lanco route 30 $cm^3/l$ | Retardan P 0.5 g/l | C 6 NF 15 $cm^3/l$ | C 6 NF 15 $cm^3/l$ | C 6 NF 12.5 $cm^3/l$ |
| Dynamic visc. (cP) | 27 | 37 | 28.5 | 31 | 28.5 |
| Yield value ($mg/cm^2$) | 190 | 137 | 0 | 4.9 | 7.3 |
| Bleeding (%) | 0 | 0 | 13 | 10 | 8 |
| Setting time | 5 mn | 5 mn | 2 h | 2 h | 1 h |
| U.C. Strength 7 days ($10^5$ Pa) | 0.45 | 8.1 | 13.6 | 7.2 | 7.25 |

| Example # | 66 | 67 | 68 | 69 |
|---|---|---|---|---|
| Additives dosage ($cm^3/l$ or g/l) | C 6 NF 10 $cm^3/l$ | C 6 NF 15 $cm^3/l$ | Pyro 8 g/l | Pyro 10 g/l |
| Dynamic visc. (cP) | 29.5 | 38.5 | 38 | 37 |
| Yield value ($mg/cm^2$) | 9.8 | 0 | 34 | 24.4 |
| Bleeding (%) | 5 | 12 | 5 | 3 |
| Setting time | 30 mn | 1 hr 45 | 1 h 30 | 2 h 30 |
| U.C. Strength 7 days ($10^5$ Pa) | 8.05 | 10.0 | | 13.65 |

A highly desired grout would have the following properties:

Marsh viscosity: 40 to 50 Marsh seconds
Dynamic viscosity: 20 to 50 centipoises
Setting time (65° C.): minimum 2 hours
Sweating: maximum 5%

In order to achieve such properties, various slurries were prepared [grouts are 800 g/l unless otherwise indicated]

| Example # | 70 | 71 | 72 | 73 |
|---|---|---|---|---|
| Additives dosage ($cm^3/l$) | C 6 NF 15 | | C 6 NF 15 Silicate 20 | C 6 NF 13 Silicate 20 |
| Dynamic visc. (cP) | 28 to 38 | 40 | | 34 |
| Yield value ($mg/cm^2$) | 5 | 317 | | 137 |
| Bleeding (%) | 10 to 13 | 0 | 1 | 7 |
| Setting time | 2 h | 5 mn | 3 h | 2 h 40 |
| U.C. Strength 7 days ($10^5$ Pa) | 7 to 13 | 6.5 | 5.0 | 6.6 |

| Example # | 74 | 75 | 76 | 77 |
|---|---|---|---|---|
| Additives dosage ($cm^3/l$) | C 6 NF 15 Silicate 20 | C 6 NF 17 Silicate 20 | C 6 NF 13 Silicate 10 | C 6 NF 15 Silicate 10 |
| Dynamic visc. (cP) | 37 | 38 | 34 | 35 |
| Yield value ($mg/cm^2$) | 137 | 180 | 9.8 | 24.4 |
| Bleeding (%) | 2 | 1.5 | 2 | .5 |
| Setting time | 3 h 10 | 3 h 15 | 1 h 10 | 1 h 10 |
| U.C. Strength 7 days ($10^5$ Pa) | 6.65 | 4.6 | 4.75 | 4.0 |

| Example # | 78 | 79 | 80 | 81 |
|---|---|---|---|---|
| Additives dosage ($cm^3/l$) | C 6 NF 17 Silicate 10 | C 6 NF 13 | C 6 NF 15 | C 6 NF 17 |
| Dynamic visc. (cP) | 37 | 35 | 32 | 29 |
| Yield value ($mg/cm^2$) | 19.5 | 0 | 0 | 0 |
| Bleeding (%) | 3 | 15 | 17 | 16 |
| Setting time | 1 h 15 | 1 h 50 | 1 h 50 | 2 h 20 |
| U.C. Strength 7 days ($10^5$ Pa) | 5.1 | 8.5 | 9.4 | 7.6 |

| Example # | 82 | 83 | 84 | 85 |
|---|---|---|---|---|
| Additives dosage ($cm^3/l$) | C 6 NF 15 Silicate 25 | Silicate 10 | Silicate 20 | Plastir. 2 $cm^3/l$ Silicate 20 |
| Dynamic visc. (cP) | 33 | 35 | 39 | 35 |
| Yield value ($mg/cm^2$) | 132 | 166 | 112 | 107 |
| Bleeding (%) | 1 | 0 | 2 | 4.5 |
| Setting time | 3 h 20 | 20 mn | 1 h 50 | 2 h 20 |
| U.C. Strength 7 days ($10^5$ Pa) | 5.6 | 8.4 | 9.75 | 7.65 |

| Example # | 86 | 87 | 88 | 89 |
|---|---|---|---|---|
| Additives dosage ($cm^3/l$) | Plastir. 3 Silicate 20 | Plastir. 4 Silicate 20 | Plastir. 2 Silicate 10 | Plastir. 3 Silicate 10 |
| Dynamic visc. (cP) | 43 | 18 | 35.5 | 35.5 |
| Yield value ($mg/cm^2$) | 59 | 132 | 68 | 71 |
| Bleeding (%) | 5 | 7 | 2.5 | 8 |
| Setting time | 2 h 50 | 3 h 00 | 1 h 10 | 2 h 20 |
| U.C. Strength 7 days ($10^5$ Pa) | 8.3 | 10.1 | 6.3 | 8.2 |

| Example # | 90 | 91 | 92 | 93 |
|---|---|---|---|---|
| Additives | Plastir. | Plastir. | Plastir. | Plastir. |

-continued

| dosage (cm³/l) | 4 Silicate 10 | 2 | 3 | 4 |
|---|---|---|---|---|
| Dynamic visc. (cP) | 34 | 31 | 31 | 33.5 |
| Yield value (mg/cm²) | 68 | 39 | 44 | 34 |
| Bleeding (%) | 11 | 3.5 | 10 | 11 |
| Setting time | 2 h 50 | 1 h 20 | 1 h 50 | 2 hr |
| U.C. Strength 7 days (10⁵ Pa) | 11.1 | 6.0 | 9.75 | 11.2 |

| Example # | 94 | 95 | 96 | 97 |
|---|---|---|---|---|
| Additives dosage (cm³/l) | | Silicate 10 | Silicate 20 | C 6 NF 15 Silic 20 lab. wat. |
| Dynamic visc. (cP) | 40 | 35 | 39 | 15.5 |
| Yield value (mg/cm²) | 317 | 166 | 112 | 78 |
| Bleeding (%) | 0 | 0 | 2 | 2 |
| Setting time | 5 mn | 20 mn | 1 h 50 | 4 h |
| U.C. Strength 7 days (10⁵ Pa) | 6.5 | 8.4 | 9.75 | 2.15 |

| Example # | 98 | 99 | 100 | 101 |
|---|---|---|---|---|
| Additives dosage (cm³/l) | C 6 NF 15 Silic 15 lab. wat. | C 6 NF 15 Silic 15 Site wat. | C 6 NF 15 Silic 15 lab. wat. | C 6 NF 15 Silic 20 Site wat. |
| Dynamic visc. (cP) | 19 | 35 | 30 | 44 |
| Yield value (mg/cm²) | 39 | 107 | 54 | 78 |
| Bleeding (%) | 3 | 0.5 | 0.5 | 2 |
| Setting time | 3 h | 2 h 20 | 2 h 00 | 3 h 15 |
| U.C. Strength 7 days (10⁵ Pa) | 2.3 | 4.1 | 3.9 | 7.1 |

Although embodiments of this invention have been shown and described, it is to be understood that various modifications and substitutions, as well as rearrangements and combinations of method steps, can be made by those skilled in the art without departing from the novel spirit and scope of this invention.

What is claimed is:

1. A composition for use in filling spent in situ oil shale retorts and mined out areas as well as for a base for roads, comprising:
   (a) combusted spent oil shale;
   (b) from about 50 weight percent to about 300 weight percent water based on said combusted powdered spent oil shale; and
   (c) at least one material selected from the group consisting of lignosulfonate, sodium silicate and sodium gluconate, wherein the maximum concentration of each material selected is 4 weight percent based on said combusted spent oil shale.

2. The composition of claim 1 wherein:
said combusted powdered spent oil shale has less than 0.5 weight percent carbon;
the maximum concentration of said water is 150 weight percent and;
the maximum concentration of each material selected is 0.5 weight percent.

3. The composition of claim 1 wherein:
said combusted powdered spent oil shale has less than 0.2 weight percent carbon;
said water is in the range of about 75 weight percent to about 100 weight percent; and
each material selected is in the range of about 0.005 weight percent to about 0.05 weight percent.

4. The composition of claim 1 wherein said combusted powdered spent oil shale has less than 0.05 weight percent carbon and at least about 70 weight percent of said combusted powdered spent oil shale has a maximum mesh size of 200 mesh.

5. The composition of claim 1 wherein said material consists of lignosulfonate and said lignosulfonate has a maximum concentration of 2.0 weight percent based on said combusted powdered spent oil shale.

6. The composition of claim 2 wherein two of said materials are selected and said materials consist of sodium silicate and lignosulfonate.

7. The composition of claim 2 wherein said material consists of sodium silicate.

8. The composition of claim 2 wherein said material consists of sodium gluconate.

9. A method for enhancing stabilization of a spent in situ oil shale retort, comprising the steps of:
forming a slurry by mixing combusted powdered spent oil shale with 50 percent to 300 percent by weight of water and at least one material selected from the group consisting of lignosulfonate, sodium silicate and sodium gluconate, wherein the maximum concentration of each material selected is 4 percent by weight of said combusted powdered spent oil shale; and
introducing a sufficient amount of said slurry into a spent in situ oil shale retort at a temperature ranging from 32° F. to 212° F. and thereafter allowing said slurry to set and solidify to form a generally coherent load bearing mass to strengthen said spent in situ oil shale retort and minimize surface subsidence.

10. The method of claim 9 wherein said slurry is formed by mixing said combusted powdered spent oil shale with a maximum of 150 weight percent of said water and from about 0.001 weight percent to about 0.5 weight percent of each material selected.

11. The method of claim 9 wherein said slurry is formed by mixing said combusted powdered spent oil shale with about 75 weight percent to about 100 weight percent of said water and from about 0.005 weight percent to about 0.05 weight percent of each material selected.

12. The method of claim 9 wherein said combusted powdered spent oil shale has a carbon content less than about 0.2 weight percent and at least about 70 weight percent of said combusted powdered spent oil shale can pass through a Standard U.S. sieve of 200 mesh.

13. The method of claim 9 wherein said slurry is formed by mixing a maximum of 2 weight percent of said lignosulfonate with said water and combusted powdered spent oil shale having less than 0.05 weight percent carbon and said lignosulfonate comprises a calcium salt of lignosulfonic acid.

14. The method of claim 10 wherein said slurry is formed by mixing said combusted powdered spent oil shale and water with two of said materials and said materials consist of sodium silicate and lignosulfonate.

15. The method of claim 9 wherein said slurry is formed by mixing said sodium silicate with said water and combusted powdered spent oil shale having less than 0.05 weight percent carbon.

16. The method of claim 9 wherein said slurry is formed by mixing said sodium gluconate with said water and combusted powdered spent oil shale having less than 0.05 weight percent carbon.

17. The method of claim 9 wherein said slurry is introduced into said spent in situ oil shale retort in stages to minimize hydraulic pressure in said spent in situ oil shale retort.

* * * * *

UNITED STATES PATENT OFFICE
CERTIFICATE OF CORRECTION

Patent No. 4,375,985            Dated March 8, 1983

Inventor(s) GUILLAUD, MAURICE AND BISSERY, PAUL H.

It is certified that error appears in the above-identified patent and that said Letters Patent are hereby corrected as shown below:

Cover Page

Item (73) Assignees:    Standard Oil Company (Indiana);
Gulf Oil Corporation, "both of Chicago, Illinois"
should be Standard Oil Company (Indiana) --Chicago, Illinois--;
Gulf Oil Corporation, --Pittsburgh, Pa.--

Signed and Sealed this

Third Day of April 1984

[SEAL]

Attest:

GERALD J. MOSSINGHOFF

Attesting Officer      Commissioner of Patents and Trademarks